(12) United States Patent
Hedtke (10) Patent No.: US 10,082,434 B2
(45) Date of Patent: Sep. 25, 2018

(54) PROCESS VARIABLE TRANSMITTER WITH PROCESS VARIABLE SENSOR CARRIED BY PROCESS GASKET

(71) Applicant: Rosemount Inc., Chanhassen, MN (US)

(72) Inventor: Robert C. Hedtke, Young America, MN (US)

(73) Assignee: ROSEMOUNT INC., Chanhassen, MN (US)

( * ) Notice: Subject to any disclaimer, the term of this patent is extended or adjusted under 35 U.S.C. 154(b) by 1 day.

(21) Appl. No.: 14/223,228

(22) Filed: Mar. 24, 2014

(65) Prior Publication Data

US 2015/0268111 A1   Sep. 24, 2015

(51) Int. Cl.

| | |
|---|---|
| *G01L 7/00* | (2006.01) |
| *G01K 1/14* | (2006.01) |
| *G01F 1/42* | (2006.01) |
| *G01K 13/02* | (2006.01) |
| *G01F 15/14* | (2006.01) |
| *F16J 15/06* | (2006.01) |
| *G01L 7/02* | (2006.01) |

(Continued)

(52) U.S. Cl.
CPC ............ *G01L 7/00* (2013.01); *F16J 15/064* (2013.01); *G01F 1/42* (2013.01); *G01F 15/14* (2013.01); *G01K 1/14* (2013.01); *G01K 13/02* (2013.01); *G01L 7/022* (2013.01); *G01L 13/02* (2013.01); *G01L 19/0007* (2013.01); *G01L 19/0092* (2013.01); *G01D 11/30* (2013.01); *G01F 23/14* (2013.01); *G01K 2013/026* (2013.01)

(58) Field of Classification Search
CPC . G01F 15/14; G01F 1/42; G01F 23/14; G01L 7/00; G01K 13/02; G01K 1/143; G01K 2013/026

USPC .......................................................... 73/700
See application file for complete search history.

(56) References Cited

U.S. PATENT DOCUMENTS 3,745,824 A   7/1973   Mannherz et al.
3,924,466 A   12/1975   Medlar
(Continued)

FOREIGN PATENT DOCUMENTS

DE   1 026 978   3/1958
DE   1026978   3/1958
(Continued)

OTHER PUBLICATIONS

Notification of Transmittal of the International Search Report and the Written Opinion of the International Searching Authority, from PCT/US2015/011129, dated Apr. 22, 2015.
(Continued)

*Primary Examiner* — Freddie Kirkland, III
(74) *Attorney, Agent, or Firm* — Westman, Champlin & Koehler, P.A.

(57) ABSTRACT

A process variable transmitter for sensing a process variable of process fluid in an industrial process includes a process gasket having a surface configured to form a seal with a process vessel face. The process gasket is exposed to the process fluid through an opening in the process vessel face. A process variable sensor is carried by the process gasket and configured to sense a process variable of the process fluid and provide a sensor output. Measurement circuitry coupled to the process variable sensor provides a process variable transmitter output related to the process variable output.

20 Claims, 10 Drawing Sheets

(51) Int. Cl.
   *G01L 13/02* (2006.01)
   *G01L 19/00* (2006.01)
   *G01D 11/30* (2006.01)
   *G01F 23/14* (2006.01)

(56) References Cited

U.S. PATENT DOCUMENTS

| | | | |
|---|---|---|---|
| 3,981,190 | A | 9/1976 | Vidmantas |
| 4,098,118 | A | 7/1978 | Schmoock |
| 4,186,599 | A | 2/1980 | Frick |
| 4,249,567 | A | 2/1981 | Weiss |
| 4,253,340 | A | 3/1981 | Schmoock |
| 4,459,858 | A | 7/1984 | Marsh |
| 4,785,672 | A | 11/1988 | Picone |
| 5,155,471 | A | 10/1992 | Ellis et al. |
| 5,226,240 | A * | 7/1993 | Stark ............... G01B 3/50 33/542 |
| 5,349,872 | A | 9/1994 | Kalotay et al. |
| 5,349,875 | A | 9/1994 | Kalotay et al. |
| 5,637,802 | A | 6/1997 | Frick et al. |
| 5,659,132 | A * | 8/1997 | Novak ............... F16J 15/064 73/114.16 |
| 5,866,823 | A | 2/1999 | Scarpa |
| 6,079,276 | A | 6/2000 | Frick |
| 6,082,199 | A | 7/2000 | Frick et al. |
| 6,089,097 | A | 7/2000 | Frick et al. |
| 6,484,585 | B1 | 11/2002 | Sittler et al. |
| 6,505,516 | B1 | 1/2003 | Frick et al. |
| 6,508,129 | B1 | 1/2003 | Sittler |
| 6,516,671 | B2 | 2/2003 | Romo et al. |
| 6,520,020 | B1 | 2/2003 | Lutz et al. |
| 6,561,038 | B2 | 5/2003 | Gravel et al. |
| 6,725,731 | B2 * | 4/2004 | Wiklund ............ F15B 15/2838 73/861.52 |
| 6,848,316 | B2 | 2/2005 | Sittler et al. |
| 6,877,386 | B2 | 4/2005 | Needham et al. |
| 7,096,738 | B2 | 8/2006 | Schumacher |
| 7,137,307 | B2 * | 11/2006 | Huybrechts ............ G01F 1/588 73/861.12 |
| 7,284,450 | B2 * | 10/2007 | Orleskie ............... G01F 1/34 73/861.52 |
| 7,559,244 | B2 * | 7/2009 | Hoimyr ............... F16L 23/16 73/706 |
| 7,610,817 | B2 | 11/2009 | Lgarashi et al. |
| 7,621,188 | B2 | 11/2009 | Lincoln et al. |
| 7,650,797 | B2 | 1/2010 | Nielsen |
| 7,654,154 | B2 * | 2/2010 | Garnett ............... G01F 1/42 73/861.52 |
| 7,665,368 | B2 | 2/2010 | Lincoln et al. |
| 7,673,523 | B2 | 3/2010 | Nielsen |
| 7,770,459 | B2 * | 8/2010 | Klosinski ............... G01F 1/42 73/716 |
| 7,930,816 | B2 | 4/2011 | Lincoln et al. |
| 8,286,502 | B2 | 10/2012 | Pelayo |
| 8,307,719 | B2 | 11/2012 | Magliocca et al. |
| 8,371,156 | B2 * | 2/2013 | Toth ............... F16J 15/064 73/114.18 |
| 8,375,800 | B2 * | 2/2013 | Lesnau, IV ............ G01L 23/08 73/744 |
| 8,561,480 | B2 | 10/2013 | Lawrence |
| 9,046,396 | B2 * | 6/2015 | Strom ............... G01F 15/18 |
| 9,062,994 | B2 * | 6/2015 | Ifft ............... G01F 1/42 |
| 9,133,951 | B2 | 9/2015 | Ohmi et al. |
| 9,222,815 | B2 * | 12/2015 | Smith ............... G01F 1/60 |
| 9,651,410 | B2 * | 5/2017 | Stehle ............... G01F 1/42 |
| 2003/0136196 | A1 * | 7/2003 | Wiklund ............ F15B 15/2838 73/716 |
| 2005/0189762 | A1 | 9/2005 | Edres et al. |
| 2005/0204822 | A1 * | 9/2005 | Schumacher ........... G01F 1/383 73/718 |
| 2009/0188327 | A1 | 7/2009 | Shanahan et al. |
| 2013/0305838 | A1 | 11/2013 | Mikolichek et al. |
| 2014/0083199 | A1 | 3/2014 | Rogers |
| 2014/0083200 | A1 | 3/2014 | Rogers et al. |

FOREIGN PATENT DOCUMENTS

| | | |
|---|---|---|
| DE | 3329689 | 3/1984 |
| DE | 19708857 | 7/1988 |
| DE | 41 14 537 | 11/1992 |
| DE | 10 2005 060 208 | 6/2007 |
| EP | 0 682 233 | 11/1995 |
| GB | 2403016 | 12/2004 |
| JP | 54-102041 | 12/1952 |
| JP | S536278 U | 1/1978 |
| JP | 55-128156 | 10/1980 |
| JP | 58-193219 | 12/1983 |
| JP | 58-213216 | 12/1983 |
| JP | S63261131 A | 10/1988 |
| JP | 2-45713 | 2/1990 |
| JP | 4-1526 | 1/1992 |
| JP | H05187896 A | 7/1993 |
| JP | 2002054972 A | 2/2002 |
| JP | 2003-509684 | 3/2003 |
| JP | 2003519377 A | 6/2003 |
| JP | 2006337234 A | 12/2006 |
| JP | 2011517742 A | 6/2011 |
| JP | 2013-007664 | 1/2013 |
| WO | 0166955 A2 | 9/2001 |
| WO | 2007023597 A1 | 3/2007 |

OTHER PUBLICATIONS

Office Action from U.S. Appl. No. 14/143,718, dated Apr. 29, 2015.
International Search Report and Written Opinion of the International Searching Authority dated May 16, 2013 for International Appl. No. PCT/US2012/068949.
SITRANS F M MAG 8000 / MAG 8000 CT/ MAG 8000 Irrigator; Water Flow Meter. Siemens. Retrieved Mar. 21, 2013 from www.automation.siemens.com/w1/index.aspx?nr=18644.
SITRANS F M MAG 5100 W. Overview. Siemens. Retrieved Mar. 21, 2013 from www.automation.siemens.com/w1/index.aspx?nr=18632.
Notification of Transmittal of the International Search Report and the Written Opinion of the International Searching Authority from PCT/US2014/055774, dated Dec. 3, 2014.
Office Action from U.S. Appl. No. 13/630,600, dated May 21, 2014.
U.S. Appl. No. 14/143,718, filed Dec. 30, 2013, 17 pages.
Rubber Fab Technologies Group, "Rubber Fab Technologies Group's SMART GASKET® Improved Pharmaceutical In Line Systems Validation", New Jersey, 2001, 4 pages.
Office Action from Japanese Patent Application No. 2015-234452, dated Jun. 1, 2016.
Office Action from Australian Patent Application No. 2015236769 dated Feb. 10, 2017.
Office Action from Chinese Patent Application No. 201410391927.2 dated Nov. 28, 2016.
Communication from European Patent Application No. 15702605.5 dated Nov. 2, 2016.
Office Action from Japanese Patent Application No. 2016-558664, dated Sep. 6, 2017, 13 pages.
Office Action from Russian Patent Application No. 2016141353, dated Jun. 7, 2017.
Office Action from Chinese Patent Application No. 201410391927.2, dated Jul. 31, 2017.
Office Action from Canadian Patent Application No. 2,943,058, dated Jul. 4, 2017.
Office Action from Chinese Patent Application No. 201410391927.2, dated Jan. 2, 2018.
Office Action from Japanese Patent Application No. 2016-558664, dated Jan. 31, 2018.
Office Action from Canadian Patent Application No. 2,943,058, dated Apr. 5, 2018.
Office Action from Chinese Patent Application No. 201410391927.2, dated May 14, 2018.
Office Action from Indian Patent Application No. 201627028956, dated Jun. 11, 2018.

* cited by examiner

PROCESS VARIABLE TRANSMITTER WITH PROCESS VARIABLE SENSOR CARRIED BY PROCESS GASKET

BACKGROUND

The present invention relates to the measurement of process variables in industrial process control and monitoring systems. More specifically, the invention relates to measurement of process variables using a process variable sensor carried by a process gasket.

Process variable sensors are used by process variable transmitters in industrial process control and monitoring systems to sense a process variables of a process fluid. Example process variables include pressure, flow, level, temperature, pH, and turbidity, among others.

In order to measure a process variable, a process variable sensor is typically coupled to the process fluid. This can be through piping, flanges, manifolds or other connections or couplings. Each of these connections must be sealed to prevent the escape of process fluid. Further, the connections can increase the complexity of the installation of a process variable transmitter in an industrial process. These couplings require "penetrations" into the industrial process which increases installation costs and complexity, reduces reliability and increases the size and weight of a process variable transmitter installation.

SUMMARY

A process variable transmitter for sensing a process variable of process fluid in an industrial process includes a process gasket having a surface configured to form a seal with a process vessel face. The process gasket is exposed to the process fluid through an opening in the process vessel face. A process variable sensor is carried by the process gasket and configured to sense a process variable of the process fluid and provide a sensor output. Measurement circuitry coupled to the process variable sensor provides a process variable transmitter output related to the process variable output.

BRIEF DESCRIPTION OF THE DRAWINGS

FIG. 6A is a perspective view, 6B is a top plan view

DETAILED DESCRIPTION OF ILLUSTRATIVE EMBODIMENTS

Figure 1:
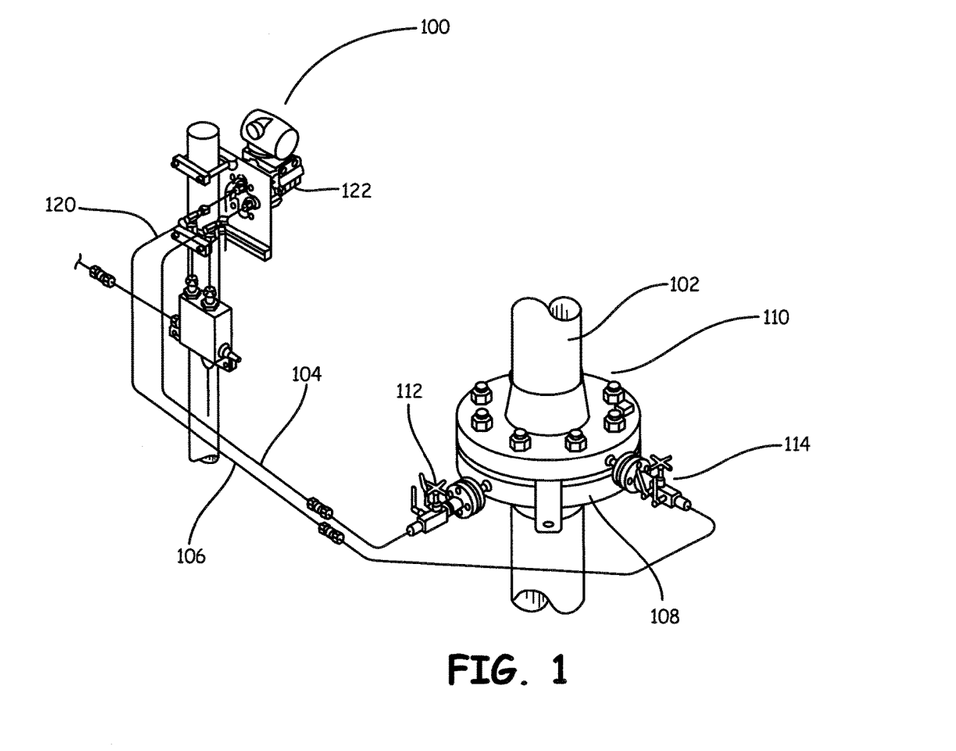
FIG. 1 is a diagram showing one example configuration of a prior art arrangement for measuring a differential pressure with a process variable transmitter.

As referenced in the Background section, measurement of process variables typically requires a penetration or other opening into a process vessel such as a tank, piping or the like in order to access process fluid. For example, FIG. 1 is a diagram showing a prior art arrangement in which a process variable transmitter 100 is used to measure a differential pressure. Transmitter 100 couples to process piping 102 through impulse lines 104, 106. These impulse lines couple to piping flanges 108, 110, respectively, which provide access to process fluid carried within piping 102. The coupling is through respective valves 112, 114. The impulse lines 104, 106 couple to the process variable transmitter 100 through additional valves 120 and a manifold 122. As illustrated by FIG. 1, the coupling of the process variable transmitter 100 to the process fluid is complex and requires multiple connections. Each connection requires an interface which must be sealed to prevent leakage.

In one aspect, a process gasket is provided which reduces the number of connections required to couple a process variable sensor to process fluid in comparison to the configuration shown in FIG. 1. In one example configuration, a process variable transmitter is coupled to a process fluid using a process gasket having at least one surface which is configured to form a seal with a face of a process fluid vessel. This allows the process gasket to be exposed to the process fluid through an opening in the process vessel face. The process gasket carries a process variable sensor which is configured to sense a process variable of the process fluid. The sensed process variable is provided to measurement circuitry which is used to provide an output related to the sensed process variable. The measurement circuitry may be formed integrally with the gasket, or may be a separate component spaced apart from the gasket, for example in a process variable transmitter. Further aspects and configurations are described below in more detail. In one example aspect, the embodiments set forth herein can advantageously use process penetrations that may already exist throughout industrial process systems to access the process fluid.

Figure 2:
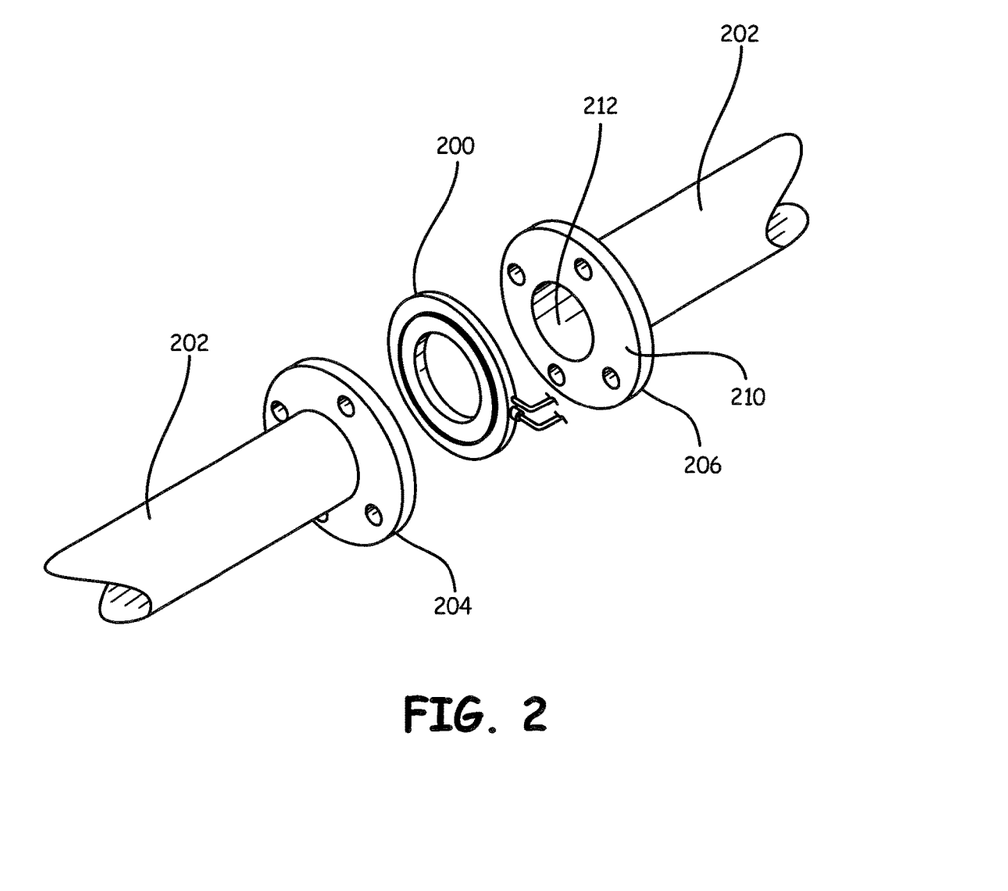
FIG. 2 is an exploded view showing one example configuration of a process gasket positioned between two flanges connected to process piping.
Figure 3:
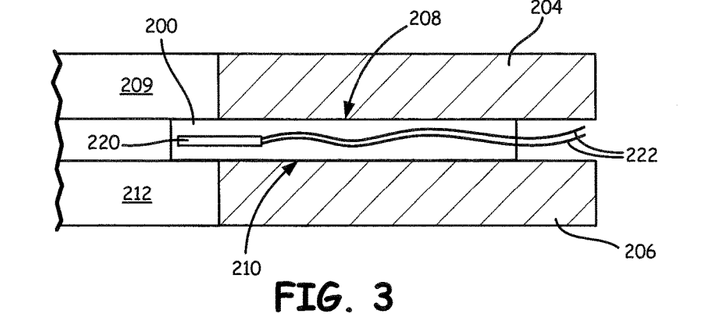
FIG. 3 is a cross-sectional view of the flanges and process gasket shown in FIG. 2 and shows a process variable sensor carried by the process gasket.

FIG. 2 is an exploded perspective view showing a process gasket 200 positioned to be sealed against flanges 204 and 206 of process piping 202 and FIG. 3 is a side cross-sectional view showing a portion of the process gasket 200 assembled between the two flanges 204 and 206. As discussed below in more detail, gasket 200 includes a process variable sensor 220 (FIG. 3) for use in sensing a process variable of the industrial process. Flange 204 includes a process vessel face 208 (FIG. 3) with an opening 209 (FIG.

3) formed therein which abuts a face of gasket 200 to form a seal with process gasket 200. Similarly, flange 206 includes a process vessel face 210 having an opening 212 formed therein which abuts an opposed surface of gasket 200 to form a seal. These are examples of a process vessel face having an opening through which access to a process fluid can be gained.

A portion of process gasket 200 extends into a space between openings 209 and 212 such that the portion of gasket 200 comes into contact with a process fluid present within openings 209 and 212. The process variable sensor 220 carried within the process gasket 200 couples to electrical connections 222 that extend out an outer circumference of process gasket 200. In the configuration shown in FIG. 3, the gasket 200 material surrounds and isolates process variable sensor 220 from any process fluid. For example, if the process variable sensor 220 is a pressure sensor, the pressure of the process fluid can be conveyed to the sensor 220 due to deflection or deformation of the gasket material. Other isolation techniques may be used, for example, isolation diaphragms. However, in another example configuration, the process variable sensor 220 is directly exposed to the process fluid in openings 209 and 212. In other embodiments, process variable sensor 220 senses other process variables, such as temperature for example, and or measures multiple process variables such as pressure and temperature.

Figure 4:
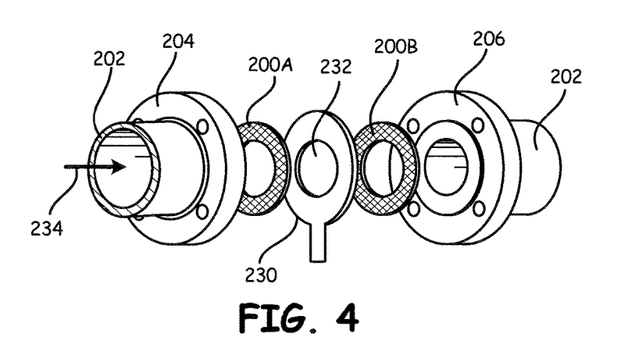
FIG. 4 is an exploded perspective view showing the use of two process gaskets and an orifice plate for use in measuring flow of a flow rate of a process fluid.
Figure 5:
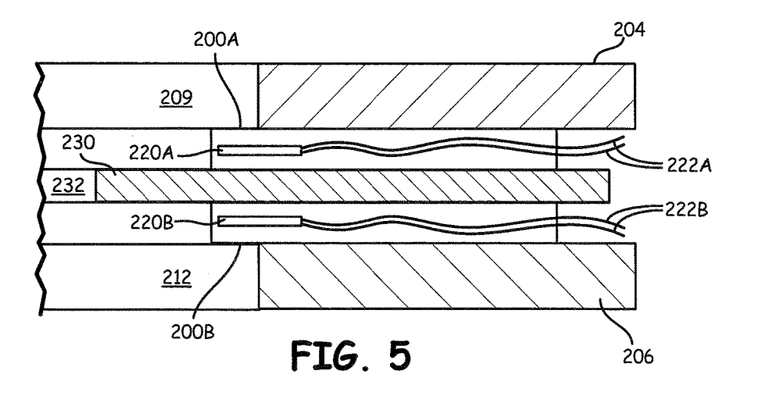
FIG. 5 is a side cross-sectional view of the configuration shown in FIG. 4 and illustrates the orifice plate sandwiched between two process gaskets each carrying a process variable sensor.

FIG. 4 is an exploded perspective view of a configuration for measuring a differential pressure using process variable sensors 220A and 220B (shown in FIG. 5) carried in process gaskets 200A and 200B, respectively. In FIG. 4, a orifice plate 230 is positioned between the process gaskets 200A and 200B and has a restricted opening 232 formed therethrough. As a flow 234 of process fluid flows through the restricted opening 232, a differential pressure is generated which is proportional to the flow rate of the process fluid. FIG. 5 shows a partial side cross-sectional view of the orifice plate 230 sandwiched between the process gaskets 200A and 200B. The process variable sensors 220A and 220B can be used to sense pressure on either side of the restricted opening 232 and used to determine flow rate. The opposed faces on the orifice plate 230 provide another example illustration of a process vessel face.

Figure 6A:
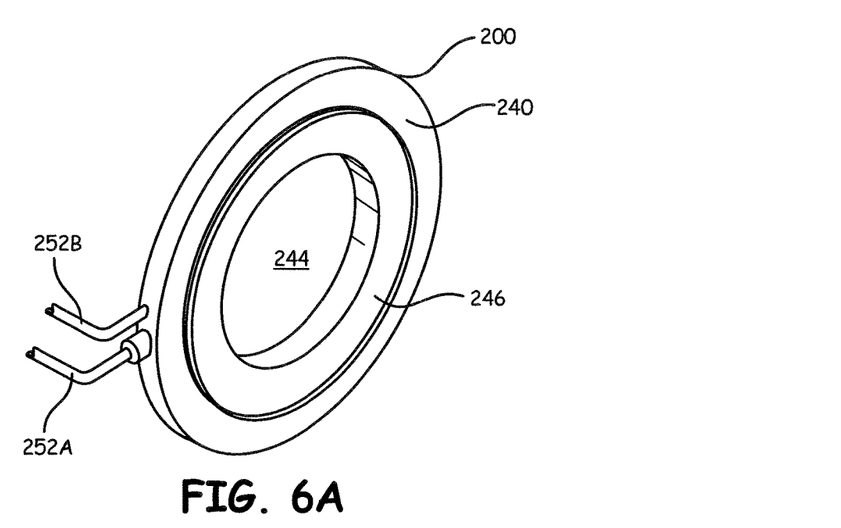
Figure 6B:
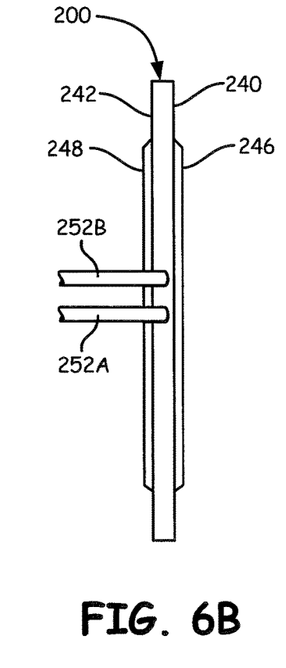
Figure 6C:
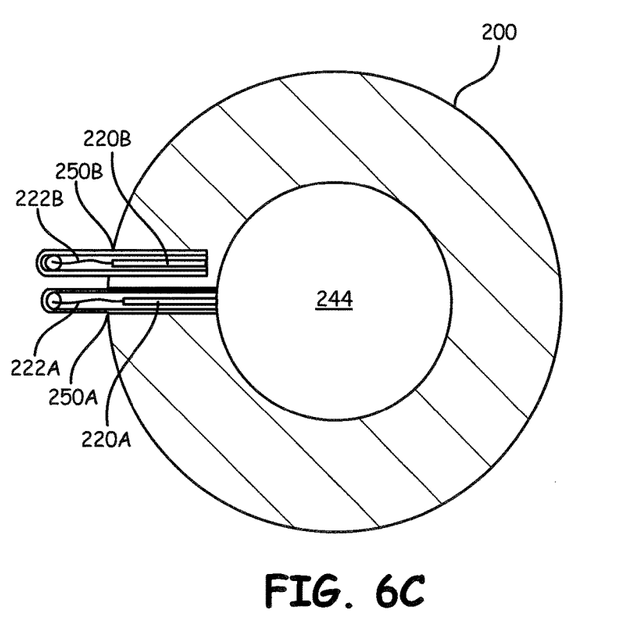
FIG. 6C is a side cross-sectional view of the process gasket illustrated in FIG. 2.

FIGS. 6A, 6B and 6C show a perspective view, a top plan view and a side cross-sectional view of the process gasket 200. As illustrated in FIGS. 6A-C, process gasket 200 includes opposed surfaces 240 and 242 and has an opening 244 formed therein. Surfaces 240 and 242 are illustrated with optional annular ridges 246, 248, respectively. Ridges 246, 248 can be used, for example, to seal against a depression or other feature of the face of flanges 204, 206. As illustrated in FIG. 6C, in this example configuration two process variable sensors 220A and 220B are carried in a single process gasket 200. In the example configuration of FIG. 6C, process variable sensor 220A is directly exposed to process fluid while process variable sensor 220B is isolated from process fluid by the gasket material. Process variable sensors 220A and 220B are carried in respective cavities 250A and 250B formed radially into the gasket 200. In this example, one sensor can measure pressure while the other sensor measures temperature. Cavities 250A and 250B may include an optional sheathing, for example, elongate tubes 252A and 252B, respectively which may also carry electrical connections 222A and 222B.

Figure 6D:
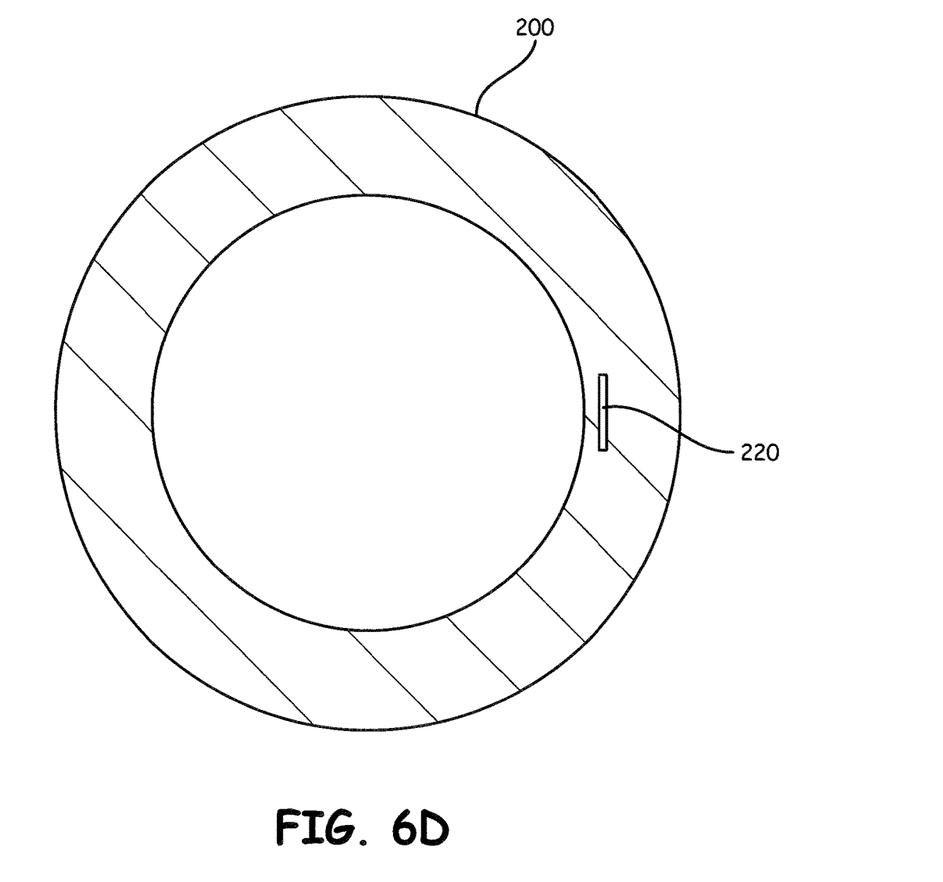
FIG. 6D is a side cross-sectional view illustrating another configuration of a process variable sensor with respect to the process gasket.

FIG. 6D is a front cross-sectional view of another example embodiment of process gasket 200. In FIG. 6D the process variable sensor 220 is arranged generally perpendicular to a radius of the process gasket 200. Note that any orientation and configuration of the process variable sensor 220 may be employed and the invention is not limited to the elongate configurations set forth herein.

Figure 6E:
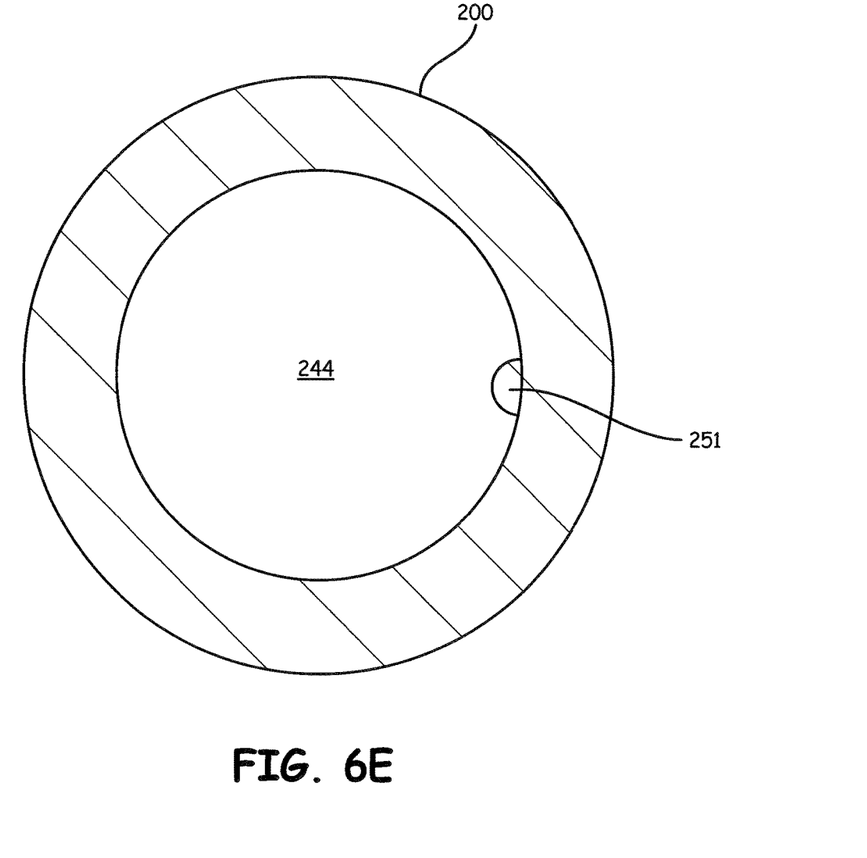
FIG. 6E is a side plan view of another example embodiment of process gasket including a pocket region formed therein.

FIG. 6E is a side plan view of another example embodiment of process gasket 200 including a pocket region 251 which extends into the opening 244 of process gasket 200. Such a configuration can be used to position a process variable sensor 220 within the flow of process fluid while the remainder of the interior circumference of gasket 200 is substantially aligned with the interior radius of process piping 202. The pocket region 251 can be fabricated of the same material as the remainder of the process gasket 200 or can be formed of a different material or composite.

Figure 7:
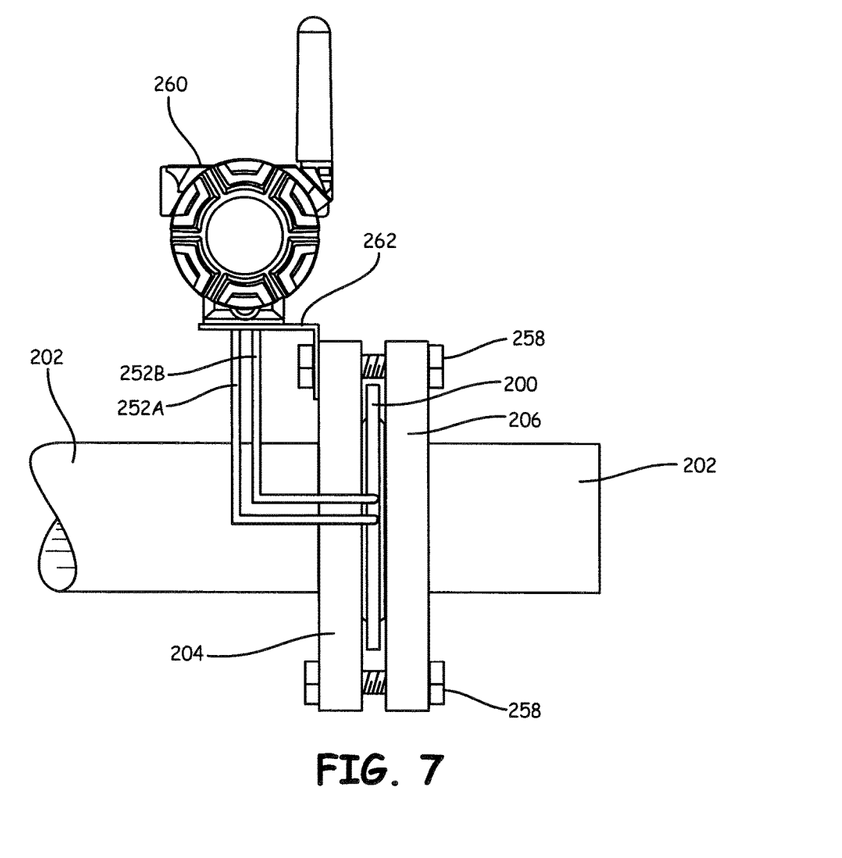
FIG. 7 is a side plan view showing a process variable transmitter coupled to the process gasket sealed between two opposed flanges coupled to process piping.

FIG. 7 is a side plan view showing process gasket 200 sealed between flanges 204 and 206 of process piping 202 using bolts 258. In this embodiment, a process variable transmitter 260 couples to the process variable sensors 220A and 220B through electrical wires carried in elongate tubes 252A and 252B, respectively. Process variable transmitter 260 can be secured directly to process piping 202 using a bracket 262 secured by one of the bolts 258.

Figure 8:
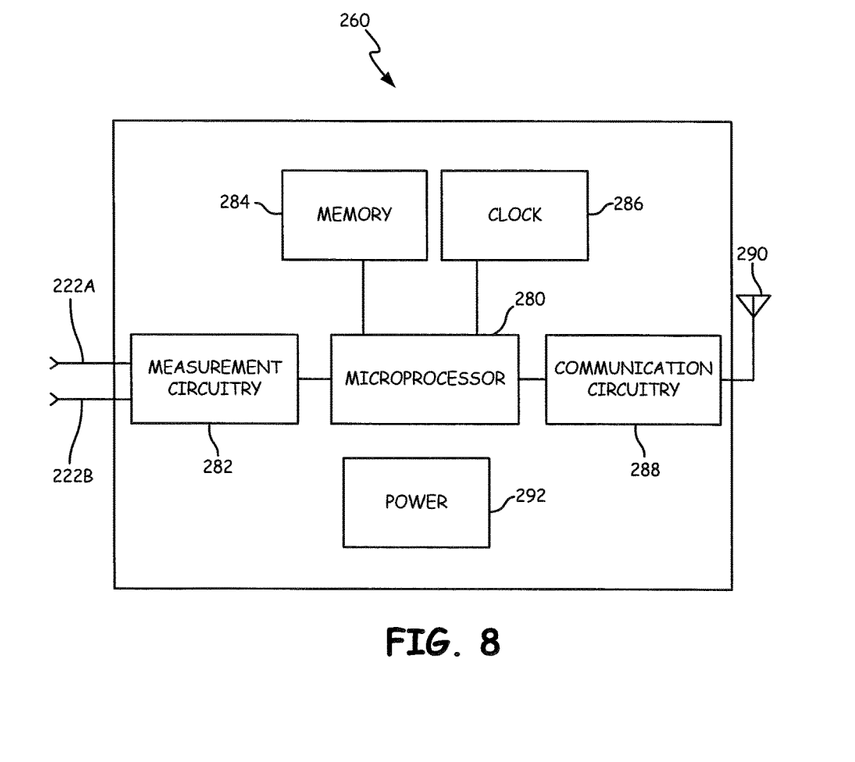
FIG. 8 is a simplified block diagram of the process variable transmitter of FIG. 7.

FIG. 8 is a simplified block diagram of process variable transmitter 260 which includes a microprocessor 280 coupled to measurement circuitry 282. Measurement circuitry is connected to the process variable sensors 220A and 220B shown in FIG. 6C through electrical connections 222A and 222B. Microprocessor 280 operates in accordance with instructions stored in a memory 284 and at a clock rate determined by clock 286. Communication circuitry 288 provides communication ability to the microprocessor 280 and couples to an antenna 290. An optional internal power source 292 is illustrated and used to power circuitry of the process variable transmitter 260.

During operation, measurement circuitry 282 is used to measure process variables sensed by process variable sensors 220A, 220B. For example, analog to digital conversion circuitry can be used to convert an analog value related to a sensed process variable into a digital value and provide it to microprocessor 280. Communication circuitry 288 is used to communicate the information related to the sensed process variable to another location such as a centralized process control room (not shown). This communication can be a wireless communication through antenna 290. One example wireless communication technique is the Wireless HART® communication protocol in accordance with the IEC 62591 Standard. However, communication circuitry 288 may also communicate over a wired connection. One example wired connection is a two-wire process control loop which may also be used to power the circuitry of the process variable transmitter 260. A process variable may be communication by controlling the current level carried in such a loop, for example between 4 mA and 20 mA. Other example process control loops include those that carry digital information such as in accordance with the HART® communication protocol. Other example communication protocols include Foundation Fieldbus and PROFIBUS.

The process variable sensors 220A, 220B may be in accordance with any appropriate technology for measuring a desired process variable. Example process variables include pressure, flow, temperature, level, pH, turbidity, etc. In one specific exemplary embodiment, the process variable sensors 220A,B are configured to sense pressure of a process fluid. One specific pressure sensing technology uses an elongate sensor made of a substantially brittle material. Examples of this type of pressure sensor are shown and described in U.S. Pat. No. 5,637,802, issued Jun. 10, 1997, entitled CAPACITIVE PRESSURE SENSOR FOR A PRESSURE TRANSMITTER WHERE ELECTRIC FIELD EMANATES SUBSTANTIALLY FROM BACK SIDES OF PLATES; U.S. Pat. No. 6,079,276, issued Jun. 27, 2000, entitled SINTERED PRESSURE SENSOR FOR A PRESSURE TRANSMITTER; U.S. Pat. No. 6,082,199, issued Jul. 4, 2000, entitled PRESSURE SENSOR CAVITY ETCHED WITH HOT $POCL_3$ GAS; U.S. Pat. No. 6,089,097, issued Jul. 18, 2000, entitled ELONGATED PRESSURE SENSOR FOR A PRESSURE TRANSMITTER; U.S. Pat. No. 6,505,516, issued Jan. 14, 2003, entitled CAPACITIVE PRESSURE SENSING WITH MOVING DIELECTRIC; U.S. Pat. No. 6,520,020, issued Feb. 18, 2003, entitled METHOD AND APPARATUS FOR A DIRECT BONDED ISOLATED PRESSURE SENSOR; U.S. Pat. No. 6,508,129, issued Jan. 21, 2003, entitled PRESSURE SENSOR CAPSULE WITH IMPROVED ISOLATION; U.S. Pat. No. 6,484,585, issued Nov. 26, 2002, entitled PRESSURE SENSOR FOR A PRESSURE TRANSMITTER; U.S. Pat. No. 6,516,671, issued Feb. 11, 2003, entitled GRAIN GROWTH OF ELECTRICAL INTERCONNECTION FOR MICROELECTROMECHANICAL SYSTEMS (MEMS); U.S. Pat. No. 6,561,038, issued May 13, 2003, entitled SENSOR WITH FLUID ISOLATION BARRIER; and U.S. Pat. No. 6,848,316, issued Feb. 1, 2005, entitled PRESSURE SENSOR ASSEMBLY, which are incorporated herein by reference in their entirety.

The process gasket 200 may be in accordance with any gasket configuration or technology type useful in industrial process control and monitoring systems. The process gasket 200 is typically configured to flow into and fill any irregularities between two process surfaces which are mated thereby sealing the two surfaces. Further, the materials should preferably be able to resist extrusion due to the loading force applied between the two surfaces and forces which arise due to process operation. Example materials which may be used to form the gasket include elastomeric materials, fibrous materials, flexible graphite, mica, Polytetrafluoroethylene (PTFE), metallic materials and others. Further, multiple materials may be used in a single gasket. The process gasket may be formed of a single sheet of material or may be a composite of a number of different materials and configurations. Example gasket configurations include kammprofile, metal eyelet, metal jacketed, metal reinforced soft gasket, corrugated metallic and spiral wound gaskets. The process variable sensor 220 may be molded into the process gasket material during fabrication. In another example, the process variable sensor is placed between various layers of a gasket during a manufacturing process. In yet another example, a process gasket is machined in order to provide a cavity for containing the process variable sensor. For example, a hole may be drilled radially through the gasket in order to hold the process variable sensor 220 and associated electrical connections.

Figure 9A:
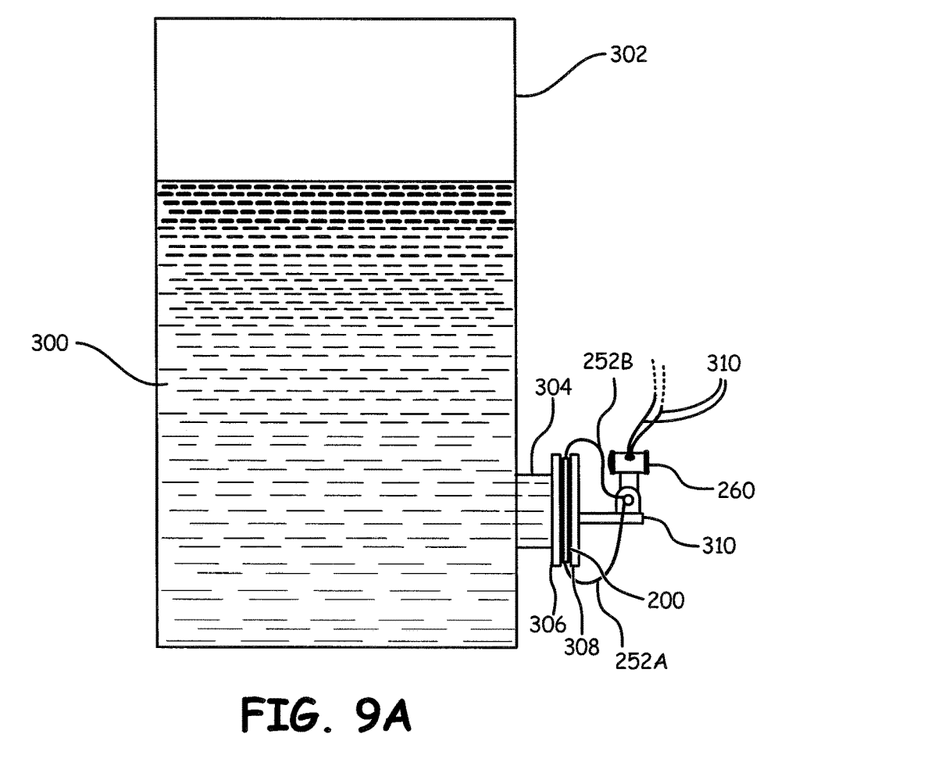
FIG. 9A is a side cross-sectional view showing a process variable transmitter coupled to a process gasket for use in measuring level of process fluid in a tank.
Figure 9B:
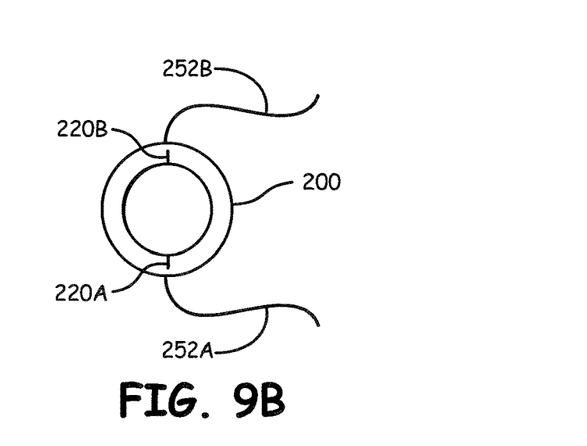
FIG. 9B is a side cross-sectional view showing the positioning of two process variable sensors within the process gasket of FIG. 9A.

FIG. 9A is a simplified diagram showing a system for measurement of a level of a process fluid 300 carried in a tank 302 which is implemented using the process gasket 200 described herein. In FIG. 9A, an extension 304 provides a penetration into the side of tank 302 and carries a flange 306. A process gasket 200 is positioned against the flange 306 and sealed to the flange 306 by flange 308. A process variable transmitter 260 is mounted to the flange 308 on a bracket 310. As illustrated n FIG. 9B, the process gasket 200 of FIG. 9A includes process variable sensors 220B, 220A positioned on a bottom and a top, respectively, of the process gasket 200. These connect to the process variable transmitter 260 through electrical connections 222 carried in elongate tubes 252A, 252B, respectively. In the configuration of FIGS. 9A and 9B, the level of the process fluid 300 may be determined based upon a pressure differential as measured by process variable sensors 220A,B. This can be communicated to another location such as a process control room. As illustrated in FIG. 9A, in this example process variable transmitter 260 uses a two-wire process control loop 310 for communication and for receiving power. In the configuration of FIG. 9A, a single process gasket carries two process variable sensors 220A,B positioned 180° apart. In another example configuration, two process gaskets 200 may be used and arranged with their respective process variable sensors 220 positioned 180° apart in order to measure the pressure differential.

Figure 10:
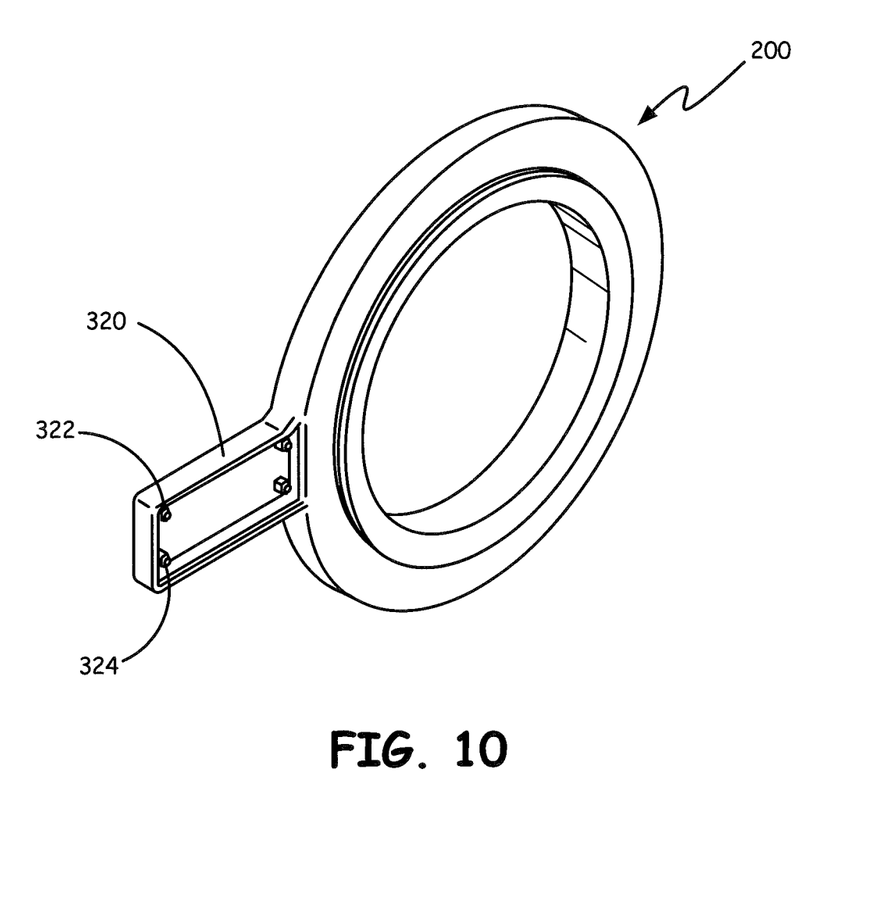
FIG. 10 is a perspective view of a process gasket which includes integral process variable transmitter circuitry.

FIG. 10 shows another example embodiment of process gasket 200. In contrast to the configuration shown in FIG. 7, in the embodiment of FIG. 10 the transmitter electronics (see FIG. 8) are carried by a paddle extension 320 which is formed as an integral component with process gasket 200. The electronics can provide the same functionality as illustrated in FIG. 8 including process variable measurement and communication. Optional electrical connectors 322 and 324 can be provided on paddle extension 320 for use in coupling to the internal circuitry. For example, these can be used to couple to a two-wire process control loop or other communication link including, for example, an I²C bus. As a further example, connectors 322, 324 can be used to provide power to internal circuitry. In another example, the circuitry within paddle extension 320 communicates wirelessly. An optional internal battery may be used to power the circuitry.

Although the present invention has been described with reference to preferred embodiments, workers skilled in the art will recognize that changes may be made in form and detail without departing from the spirit and scope of the invention. As used herein, the term "gasket" refers to any component which is used to provide a mechanical seal between two surfaces. In one configuration, the gasket extends in a plane. However, the gasket may be formed in configurations which are not planar. In one configuration, the gasket includes an opening therethrough, and in a specific configuration, the opening is circular. However, the gasket is not limited to a circular configuration or to a configuration which includes an opening therethrough. The gasket may be fabricated from any appropriate material for a particular use. The process gasket described herein is configured to seal against a face of a process vessel which carries or is otherwise coupled to process fluid. As used herein, the term "face" is not limited to a planar face. Further, the term "vessel" includes any component within an industrial process which carries or is coupled to process fluid. Although the process gaskets set forth herein are illustrated as having an annular configuration, the invention is not limited to such a design.

What is claimed is:

1. A process variable transmitter for sensing a process variable of process fluid in an industrial process, comprising:
 a process gasket having a surface configured to form a seal between a process flange and a process vessel face of the industrial process, wherein the process gasket is exposed to the process fluid of the industrial process through an opening in the process vessel face, the process gasket including a bore which extends from an outer radius of the process gasket into the process gasket;

a process variable sensor carried in the bore of the process gasket, the process variable sensor configured to sense a process variable of the process fluid of the industrial process and provide a sensor output, wherein the process variable sensor is positioned in the process gasket and the process gasket surrounds and isolates the process variable sensor from the process fluid of the industrial process; and measurement circuitry coupled to the process variable sensor configured to provide a process variable output related to the sensed process variable output for use in controlling or monitoring the industrial process;

wherein the process variable sensor comprises a pressure sensor and pressure from the process fluid is applied to the pressure sensor through the process gasket.

2. The process variable of claim 1 including a second process variable sensor configured to sense temperature.

3. The process variable transmitter of claim 1 wherein the process variable sensor is made of a brittle material.

4. The process variable transmitter of claim 1 wherein the process variable sensor is embedded in the process gasket.

5. The process variable transmitter of claim 1 including a second process gasket having a second process variable sensor and wherein the measurement circuitry is configured to measure a differential pressure between the process variable sensor and the second process variable sensor.

6. The process variable transmitter of claim 5 including an orifice plate configured to produce a differential pressure in a flow of the process fluid and wherein the process gasket and the second process gasket are positioned on opposed sides of the orifice plate.

7. The process variable transmitter of claim 1 wherein the process vessel face comprises a flange of process piping.

8. The process variable transmitter of claim 1 wherein the process vessel face comprises a flange of a tank.

9. The process variable transmitter of claim 1 wherein the process gasket includes a second process variable sensor spaced apart from the process variable sensor.

10. The process variable transmitter of claim 9 wherein the process variable sensor and the second process variable sensor are configured to measure a differential pressure.

11. The process variable transmitter of claim 10 wherein the differential pressure is related to level of process fluid in a tank.

12. The process variable transmitter of claim 1 wherein the process gasket is annular.

13. The process variable transmitter of claim 12 wherein the process variable sensor is arranged radially in the process gasket.

14. The process variable transmitter of claim 1 wherein the measurement circuitry is mounted to the process vessel face.

15. The process variable transmitter of claim 1 wherein the measurement circuitry is carried integrally with the process gasket.

16. The process variable transmitter of claim 15 wherein the process gasket includes a paddle extension which carries the measurement circuitry.

17. A process gasket for sealing against a process vessel face of an industrial process, comprising:

an annular ring formed of a gasket material having first and second opposed surfaces which are configured to seal against respective first and second process vessel faces of the industrial process;

an opening in a center of the annular ring which is configured to receive a process fluid of the industrial process therein;

a cavity formed in the annular ring comprising a bore which extends from an outer radius of the annular ring into the annular ring;

a process variable sensor carried in the cavity of the annular ring configured to sense a process variable of the process fluid of the industrial process, wherein the process variable sensor is positioned in the annular ring, and the annular ring surrounds and isolates the process variable sensor from the process fluid of the industrial process; and electrical connections that couple to the process variable sensor and extend from the cavity through the annular ring to a location outside of the annular ring;

wherein the process variable sensor comprises a pressure sensor and pressure from the process fluid is applied to the pressure sensor through the annular ring.

18. The process gasket of claim 17 wherein the process variable sensor is formed of a elongate brittle material.

19. The process gasket of claim 17 including a second cavity formed in the annular ring and a second process variable sensor carried in the second cavity configured to sense a second process variable.

20. The process gasket of claim 19 wherein the second process variable sensor comprises a temperature sensor.

* * * * *